(12) United States Patent
Yang

(10) Patent No.: US 11,797,296 B2
(45) Date of Patent: Oct. 24, 2023

(54) HOT UPDATING METHOD OF SCRIPT FILE PACKAGE AND HOT UPDATING DEVICE OF SCRIPT FILE PACKAGE

(71) Applicant: BOE TECHNOLOGY GROUP CO., LTD., Beijing (CN)

(72) Inventor: Yonggui Yang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 380 days.

(21) Appl. No.: 17/295,597

(22) PCT Filed: May 25, 2020

(86) PCT No.: PCT/CN2020/092016
§ 371 (c)(1),
(2) Date: May 20, 2021

(87) PCT Pub. No.: WO2020/253469
PCT Pub. Date: Dec. 24, 2020

(65) Prior Publication Data
US 2022/0019425 A1    Jan. 20, 2022

(30) Foreign Application Priority Data
Jun. 20, 2019  (CN) .......................... 201910537419.3

(51) Int. Cl.
*G06F 21/00*  (2013.01)
*G06F 8/656*  (2018.01)
(Continued)

(52) U.S. Cl.
CPC .............. *G06F 8/656* (2018.02); *G06F 21/16* (2013.01); *H04L 9/0643* (2013.01); *H04L 9/0869* (2013.01); *G06F 2221/0733* (2013.01)

(58) Field of Classification Search
CPC .. G06F 8/656; G06F 21/16; G06F 2221/0733; G06F 21/572; G06F 8/65;
(Continued)

(56) References Cited

U.S. PATENT DOCUMENTS

2013/0111455 A1* 5/2013 Li .......................... H04L 9/3239
717/169
2017/0180137 A1 6/2017 Spanier et al.
(Continued)

FOREIGN PATENT DOCUMENTS

CN      103235906 A    8/2013
CN      105050081 A    11/2015
(Continued)

OTHER PUBLICATIONS

First Office Action for Chinese Application No. 201910537419.3, dated Feb. 7, 2021, 8 Pages.
International Search Report and Written Opinion for Application No. PCT/CN2020/092016, dated Jul. 30, 2020, 9 Pages.

*Primary Examiner* — Jeffrey C Pwu
*Assistant Examiner* — William A Corum, Jr.
(74) *Attorney, Agent, or Firm* — Brooks Kushman P.C.

(57) ABSTRACT

A hot updating method of script file package and a hot updating device of script file package are provided, which belongs to the technical field of hot updating. The hot updating method of script file package includes: receiving an update request of a terminal for an application program, where the update request carries a terminal identification; acquiring an initial script file packet of the application program, extracting an encryption feature vector of the initial script file packet, encrypting the initial script file packet according to the encryption feature vector, and generating an encrypted script file packet; calculating a first MD5 value of the encrypted script file packet; calculating an encrypted feature value of a combination of the terminal
(Continued)

identification and the feature vector; and generating a hot update package, according to the encrypted script file package, the first MD5 value and the encrypted feature value, and sending the hot update package to the terminal.

20 Claims, 7 Drawing Sheets

(51) Int. Cl.
    *G06F 21/16*     (2013.01)
    *H04L 9/06*     (2006.01)
    *H04L 9/08*     (2006.01)

(58) Field of Classification Search
    CPC ... H04L 9/0643; H04L 9/0869; H04L 9/0894; H04L 9/3239; H04L 9/3236; H04L 41/082
    See application file for complete search history.

(56) References Cited

U.S. PATENT DOCUMENTS

2017/0374551 A1    12/2017    Shen et al.
2018/0067777 A1*    3/2018    Wang ............... G06F 11/368

FOREIGN PATENT DOCUMENTS

| | | |
|---|---|---|
| CN | 105260209 A | 1/2016 |
| CN | 106155729 A | 11/2016 |
| CN | 107179925 A | 9/2017 |
| CN | 107391104 A | 11/2017 |
| CN | 107729041 A | 2/2018 |
| CN | 108710500 A | 10/2018 |
| CN | 109740309 A | 5/2019 |
| CN | 109800009 A | 5/2019 |
| CN | 110278115 A | 9/2019 |
| WO | 2016019790 A1 | 2/2016 |

\* cited by examiner

FIG. 8

HOT UPDATING METHOD OF SCRIPT FILE PACKAGE AND HOT UPDATING DEVICE OF SCRIPT FILE PACKAGE

CROSS-REFERENCE TO RELATED APPLICATIONS

This application is the U.S. national phase of PCT Application No. PCT/CN2020/092016 filed on May 25, 2020, which claims priority to Chinese Patent Application No. 201910537419.3 filed on Jun. 20, 2019, which are incorporated herein by reference in their entireties.

TECHNICAL FIELD

The present disclosure relates to the field of hot update technologies, and in particular, to a hot updating method of script file package and a hot updating device of script file package.

BACKGROUND

Read Native (an open source framework for developing applications based on JavaScript framework) hot updating can update code and resources without reinstallation of the application. The working mechanism thereof is to pack a series of resource files into bundle files, and the application program loads the bundle files to further complete hot update. In the related art, all JS files (script files) are packaged into one bundle file during Read Native hot updating, and the whole bundle file is issued. If the bundle file is incomplete, the loading will fail, and application program will crash; if the bundle file is tampered, the content of the application program can be distorted.

SUMMARY

In order to solve the above technical problem, the embodiments of the present disclosure provide the following technical solutions:

In one aspect, a hot updating method of script file package is provided, including:
  receiving an update request of a terminal for an application program, where the update request carries a terminal identification;
  acquiring an initial script file packet of the application program, extracting an encryption feature vector of the initial script file packet, encrypting the initial script file packet according to the encryption feature vector, and generating an encrypted script file packet;
  calculating a first MD5 value of the encrypted script file packet;
  calculating an encrypted feature value of a combination of the terminal identification and the feature vector; and
  generating a hot update package, according to the encrypted script file package, the first MD5 value and the encrypted feature value, and sending the hot update package to the terminal.

Optionally, prior to the encrypting the initial script file package according to the encryption feature vector, the method further includes:
  adding digital watermarking information into the initial script file packet.

Optionally, the method further includes:
  generating a second MD5 value of an identification of the application program, and adding the second MD5 value into the hot update package.

Optionally, the extracting the encryption feature vector of the initial script file packet, encrypting the initial script file packet according to the encryption feature vector and generating the encrypted script file packet further includes:
  extracting an identification serial number and a corresponding line number of codes of the initial script file packet, and forming a first encryption array based on the identification serial number and the corresponding line number;
  calculating the identification serial number and the corresponding line number respectively based on a random number, to generate a changed identification serial number and a corresponding line number, forming a second encryption array based on the changed identification serial number and the corresponding line number, and forming the encryption feature vector based on the first encryption array and the second encryption array; and
  rearranging the codes of the initial script file packet based on the second encryption array to obtain the encrypted script file packet.

Optionally, the random number is generated based on an absolute time of receiving the update request.

Optionally, the calculating the encrypted feature value of the combination of the terminal identification and the feature vector further includes:
  combining the terminal identification and the encryption feature vector to obtain a combined value; and
  encrypting the combined value through a preset key to obtain the encrypted feature value, where the preset key is agreed by a server and the terminal in advance.

A hot updating method of script file package is further provided, applied to a terminal and including:
  sending an update request for an application program to a server, where the update request carries a terminal identification;
  receiving a hot update package of the server, where the hot update package includes an encrypted script file package, a first MD5 value of the encrypted script file package and an encrypted feature value, and the encrypted feature value is obtained by calculating a combination of the terminal identification and an encryption feature vector;
  verifying the encrypted script file packet according to the first MD5 value;
  after the verifying is passed, decrypting the encrypted feature value to obtain the encryption feature vector; and
  decrypting the encrypted script file packet based on the encryption feature vector to obtain an initial script file packet of the application program.

Optionally, the hot update package further includes a second MD5 value of an identification of the application program, where subsequent to the verifying the encrypted package of script files based on the first MD5 value, the method further includes:
  verifying the encrypted script file packet based on the second MD5 value.

Optionally, the verifying the encrypted script file package based on the first MD5 value includes:
  generating a third MD5 value based on the received encrypted script file packet, determining whether the third MD5 value is consistent with the first MD5 value, and passing the verifying in a case that the third MD5 value is consistent with the first MD5 value;
  the verifying the encrypted script file packet based on the second MD5 value includes:

generating a fourth MD5 value based on the identification of the application program stored in the terminal, determining whether the fourth MD5 value is consistent with the second MD5 value, and passing the verifying in a case that the fourth MD5 value is consistent with the second MD5 value.

Optionally, the decrypting the encrypted feature value to obtain the encryption feature vector includes:

decrypting the encrypted feature value through a preset key to obtain a combined value of the terminal identification and the encryption feature vector, where the preset key is agreed by a server and the terminal in advance; and capturing the encryption feature vector from the combined value based on a terminal identification stored in the terminal.

Optionally, the decrypting the encrypted script file package based on the feature vector to obtain the initial script file package of the application program includes:

decomposing the feature vector into a first array and a second array, where the first array consists of an identification serial number and a corresponding line number of codes of the initial script file packet, and the second encrypted array consists of a changed identification serial number and a corresponding line number;

determining the identification serial number and the corresponding line number of the codes of the initial script file packet according to a correspondence between the first array and the second array, and restoring the encrypted script file packet into the initial script file packet based on the identification serial number and the corresponding line number.

Optionally, the initial script file package includes digital watermarking information, and after obtaining the initial script file package of the application program, the method further includes:

verifying, based on the digital watermarking information, whether the initial script file packet is valid; and loading the initial script file package in a case that the initial script file package is valid.

A hot updating device of script file package is further provided, including:

a receiving module, configured to receive an update request of a terminal for an application program, where the update request carries a terminal identification;

a first encrypting module, configured to acquire an initial script file packet of the application program, extract an encryption feature vector of the initial script file packet, encrypt the initial script file packet according to the encryption feature vector, and generate an encrypted script file packet;

a first MD5 value calculating module, configured to calculate a first MD5 value of the encrypted script file packet;

a second encrypting module, configured to calculate an encrypted feature value of a combination of the terminal identification and the feature vector; and a sending module, configured to generate a hot update package, according to the encrypted script file package, the first MD5 value and the encrypted feature value, and sending the hot update package to the terminal.

Optionally, the device further includes:

a watermarking module, configured to add digital watermarking information into the initial script file packet.

Optionally, the device further includes:

a second MD5 value generation module, configured to generate a second MD5 value of an identification of the application program and add the second MD5 value into the hot update package.

Optionally, the first encrypting module includes:

an extraction unit, configured to extract an identification serial number and a corresponding line number of codes of the initial script file packet, and forming a first encryption array based on the identification serial number and the corresponding line number;

an calculating unit, configured to calculate the identification serial number and the corresponding line number respectively based on a random number, to generate a changed identification serial number and a corresponding line number, form a second encryption array based on the changed identification serial number and the corresponding line number, and form the encryption feature vector based on the first encryption array and the second encryption array; and a processing unit, configured to rearrange the codes of the initial script file packet based on the second encryption array to obtain the encrypted script file packet.

Optionally, the second encrypting module includes:

a combining unit, configured to combine the terminal identification and the encryption feature vector to obtain a combined value;

an encrypting unit, configured to encrypt the combined value through a preset key to obtain the encrypted feature value, where the preset key is agreed by a server and the terminal in advance.

A hot updating device of script file package, applied to a terminal and including:

a sending module, configured to send an update request for an application program to a server, where the update request carries a terminal identification;

a receiving module, configured to receive a hot update package of the server, where the hot update package includes an encrypted script file package, a first MD5 value of the encrypted script file package and an encrypted feature value, and the encrypted feature value is obtained by calculating a combination of the terminal identification and an encryption feature vector;

a verifying module, configured to the encrypted script file packet according to the first MD5 value;

a first decrypting module, configured to decrypt the encrypted feature value to obtain the encryption feature vector; and a second decrypting module, configured to decrypt the encrypted script file packet based on the encryption feature vector to obtain an initial script file packet of the application program.

Optionally, the hot update package further includes: a second MD5 value of an identification of the application program, the verifying module is further configured to verify the encrypted script file package based on the second MD5 value.

Optionally, the verifying module includes:

a first verification unit, configured to generate a third MD5 value based on the received encrypted script file packet, determine whether the third MD5 value is consistent with the first MD5 value, and pass the verifying in a case that the third MD5 value is consistent with the first MD5 value;

a second verification unit, configured to generate a fourth MD5 value based on the identification of the application program stored in the terminal, determine whether the fourth MD5 value is consistent with the second MD5 value, and pass the verifying in a case that the fourth MD5 value is consistent with the second MD5 value.

Optionally, the first decrypting module includes:
a decryption unit, configured to decrypt the encrypted feature value through a preset key to obtain a combined value of the terminal identification and the encryption feature vector, where the preset key is agreed by a server and the terminal in advance;
a capturing unit, configured to capture the encryption feature vector from the combined value based on a terminal identification stored in the terminal.

Optionally, the second decrypting module includes:
a decomposing unit, configured to decompose the feature vector into a first array and a second array, where the first array consists of an identification serial number and a corresponding line number of codes of the initial script file packet, and the second encrypted array consists of a changed identification serial number and a corresponding line number;
a processing unit, configured to determine the identification serial number and the corresponding line number of the codes of the initial script file packet according to a correspondence between the first array and the second array, and restore the encrypted script file packet into the initial script file packet based on the identification serial number and the corresponding line number.

Optionally, the initial script file package includes digital watermarking information, the hot updating device of script file package further includes:
a watermarking verifying module, configured to verify, based on the digital watermarking information, whether the initial script file packet is valid;
a loading module, configured to load the initial script file package in a case that the initial script file package is valid.

A hot updating device of script file package is further provided, including a processor, a memory and a computer program stored in the memory and running on the processor, where the processor executes the computer program to perform the hot updating method of script file package hereinabove.

A computer-readable storage medium is further provided, where a computer program is stored in the computer-readable storage medium, where a processor executes the computer program to perform the hot updating method of script file package hereinabove.

BRIEF DESCRIPTION OF THE DRAWINGS

Figure 8:
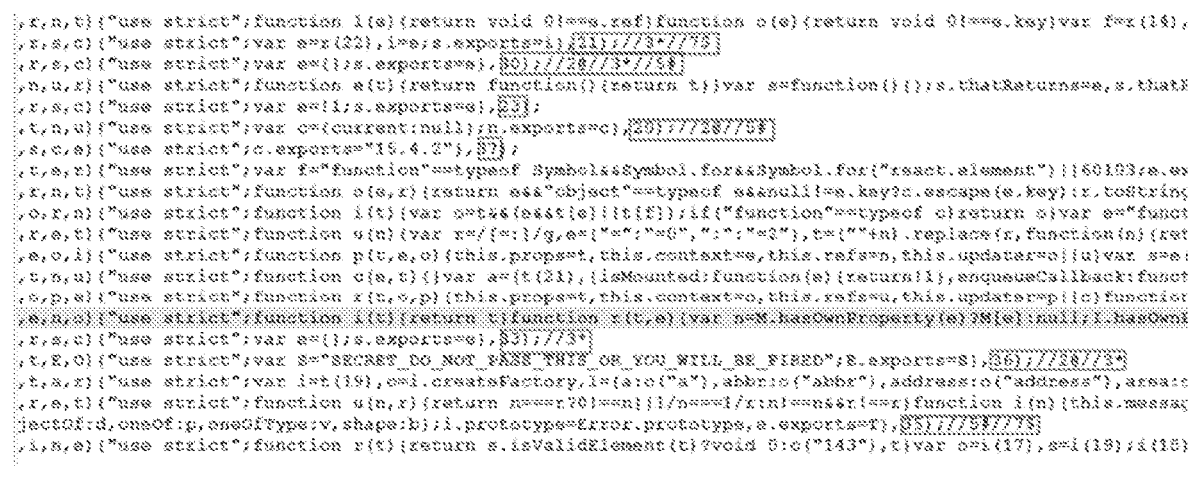

FIG. 8 is a schematic diagram of adding digital watermarking information according to an embodiment of the disclosure.

DETAILED DESCRIPTION

To make the technical problems, technical solutions and advantages to be solved by the embodiments of the present disclosure clearer, the following detailed description is given with reference to the accompanying drawings and specific embodiments. How to ensure the integrity and tamper-proofing of bundle files during Read Native hot update and effectively avoid the collapse of application programs and the accuracy of program information becomes a technical problem to be solved at present. However, the related art involve fewer security and tamper-proof encryption measures and encryption processes for the hot update package, and little concern is brought about the software copyright problem of the Read Native update package, while this is also an important link that the loading fails, so that the program is crashed, even the program is tampered, an ilvalid program is provided, and user information is lost.

In order to solve the above problem, the present disclosure provide a hot updating method of script file package in some embodiments of the present disclosure, which can ensure integrity and tamper-proofing of a script file.

Figure 1:
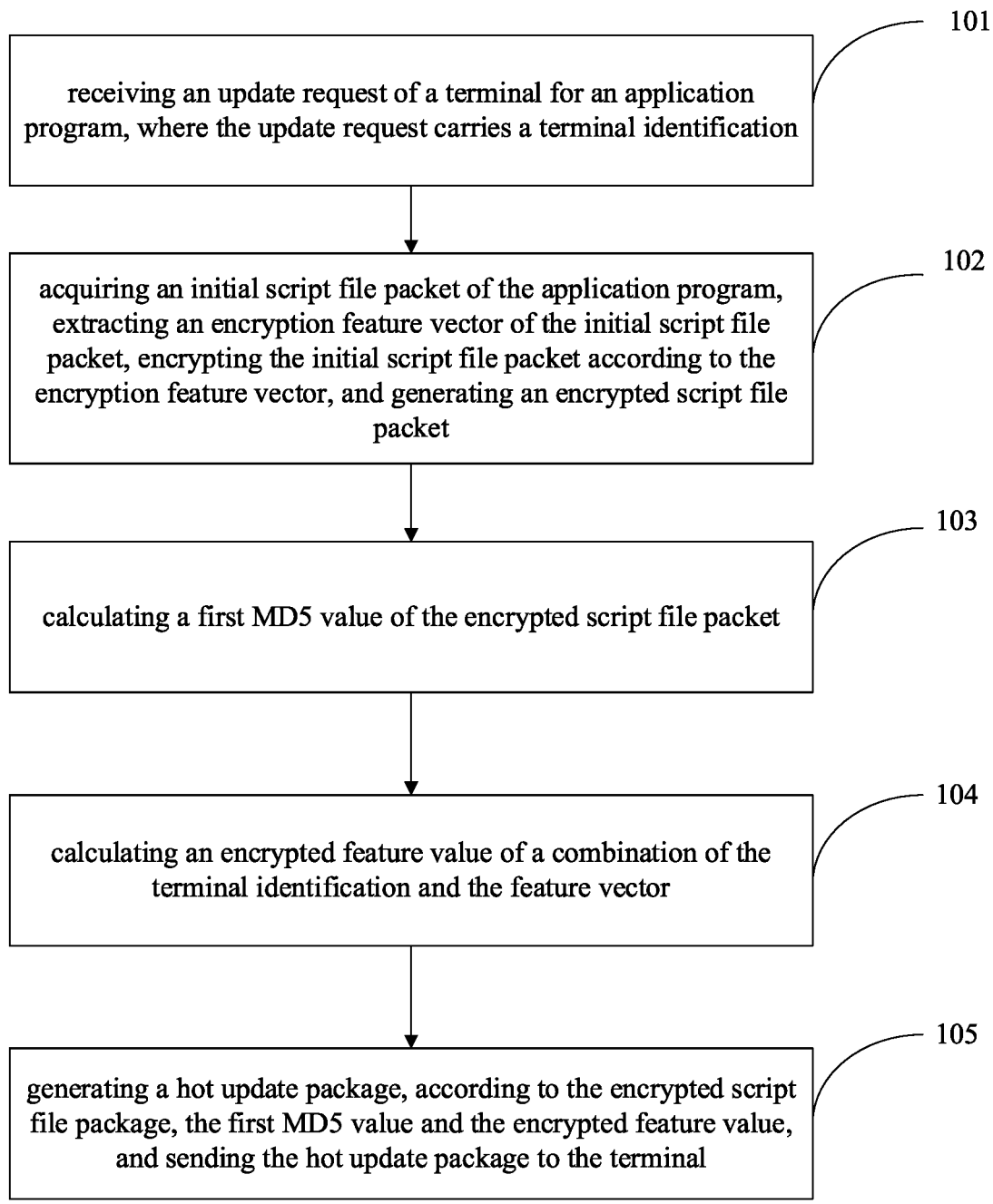
FIG. 1 is a flowchart of a hot updating method of script file package according to an embodiment of the disclosure.

The embodiment of the present disclosure provides a hot updating method of script file package, as shown in FIG. 1, the method including:

Step 101: receiving an update request of a terminal for an application program, where the update request carries a terminal identification;
when the terminal detects that the application needs to be updated, an update request is sent to the server, where the update request carries a terminal identification, which indicates which terminal requests to be updated, and the terminal identification uniquely represents the terminal, which may specifically be a serial code of the terminal.

Step 102: acquiring an initial script file packet of the application program, extracting an encryption feature vector of the initial script file packet, encrypting the initial script file packet according to the encryption feature vector, and generating an encrypted script file packet;
in order to ensure the security of the script file, the server extracts the information of the initial script file packet as an encryption feature vector to encrypt the initial script file packet.

Step 103: calculating a first MD5 value of the encrypted script file packet;
in order to ensure the integrity of the script file, the server also generates a first MD5 value of the encrypted script file packet, and the terminal can judge whether the script file is complete or not by checking the first MD5 value.

Step 104: calculating an encrypted feature value of a combination of the terminal identification and the feature vector;
in order to prevent the encryption feature vector from being invalidly acquired by a third party in the transmission process, the server also encrypts the combination of the terminal identification and the encryption feature vector.

Step 105: generating a hot update package, according to the encrypted script file package, the first MD5 value and the encrypted feature value, and sending the hot update package to the terminal.

In order to save transmission resources, the server may package and send the encrypted script file packet, the first MD5 value, and the encrypted feature value to the terminal.

In this embodiment, the hot update package sent by the server to the terminal includes an encrypted script file package, a first MD5 value of the encrypted script file package, and an encrypted feature value for encrypting the script file package; by extracting the encryption feature vector from the initial script file packet and encrypting the script file packet, the script file packet can be effectively prevented from being tampered and maliciously copied; in addition, the first MD5 value of the encrypted script file packet is sent to the terminal, so that the uniqueness and the integrity of the encrypted script file packet can be guaranteed, and the terminal can determine whether the received encrypted script file packet is complete or not by verifying the first MD5 value, so that the terminal is prevented from loading incomplete script file packets.

Specifically, the script file packet is a bundle packet.

In a specific embodiment, before encrypting the initial script file packet according to the encryption feature vector, the method further includes: adding digital watermarking information into the initial script file packet. By adding the digital watermarking information to the script file package, the software copyright of the Read Native update package can be protected, the script file package is prevented from being tampered at a terminal, and even if the script file package is maliciously copied to other equipment after being decrypted, a malicious copying party can be effectively traced through the digital watermarking information.

In another embodiment, the hot updating method of script file package further comprises:
generating a second MD5 value of an identification of the application program, and adding the second MD5 value into the hot update package, so that the terminal can determine whether the received encrypted script file package is directed to the application program required to be updated by the terminal by verifying the second MD5 value, and the terminal is prevented from loading an incorrect script file package.

In a specific embodiment, the extracting the encryption feature vector of the initial script file packet, encrypting the initial script file packet according to the encryption feature vector and generating the encrypted script file packet further includes:
extracting an identification serial number and a corresponding line number of codes of the initial script file packet, and forming a first encryption array based on the identification serial number and the corresponding line number;
calculating the identification serial number and the corresponding line number respectively based on a random number, to generate a changed identification serial number and a corresponding line number, forming a second encryption array based on the changed identification serial number and the corresponding line number, and forming the encryption feature vector based on the first encryption array and the second encryption array; and
rearranging the codes of the initial script file packet based on the second encryption array to obtain the encrypted script file packet.

In the above embodiment, the encryption feature vector is generated based on the identification serial number of the code of the initial script file packet and the corresponding line number, but the present disclosure is not limited to generating the encryption feature vector through the above method, and may also generate the encryption feature vector based on other information of the initial script file packet and encrypt the initial script file packet.

The random number may be generated randomly or according to a certain rule, and in a specific example, the random number may be generated based on an absolute time for receiving the update request. Specifically, the identification number and the corresponding line number may be subjected to operations such as addition, subtraction, or complementation using a random number.

In a specific embodiment, the calculating the encrypted feature value of the combination of the terminal identification and the feature vector further includes:
combining the terminal identification and the encryption feature vector to obtain a combined value; and
encrypting the combined value through a preset key to obtain the encrypted feature value, where the preset key is agreed by a server and the terminal in advance.

After receiving the encrypted feature value, the terminal can decrypt the encrypted feature value based on a preset key to obtain a combined value of the terminal identification and the encryption feature vector, and then the terminal can determine the encryption feature vector from the combined value based on the terminal identification of the terminal, so that the encrypted script file packet is decrypted to obtain an initial script file packet. The terminal identification can only be obtained by the terminal and cannot be obtained by other terminals, the combination value is obtained by combining the terminal identification and the encryption feature vector, the encryption feature vector can be determined from the combination value only by a correct receiving terminal, and the safety of the script file can be further ensured.

The embodiment of the disclosure has the following beneficial effects:
in the scheme, the hot update package sent to the terminal by the server comprises an encrypted script file package, a first MD5 value of the encrypted script file package and an encrypted feature value for encrypting the script file package; by extracting the encryption feature vector from the initial script file packet and encrypting the script file packet, the script file packet can be effectively prevented from being tampered and maliciously copied; in addition, the first MD5 value of the encrypted script file packet is sent to the terminal, so that the uniqueness and the integrity of the encrypted script file packet can be guaranteed, and the terminal can determine whether the received encrypted script file packet is complete or not by verifying the first MD5 value, so that the terminal is prevented from loading incomplete script file packets.

Figure 2:
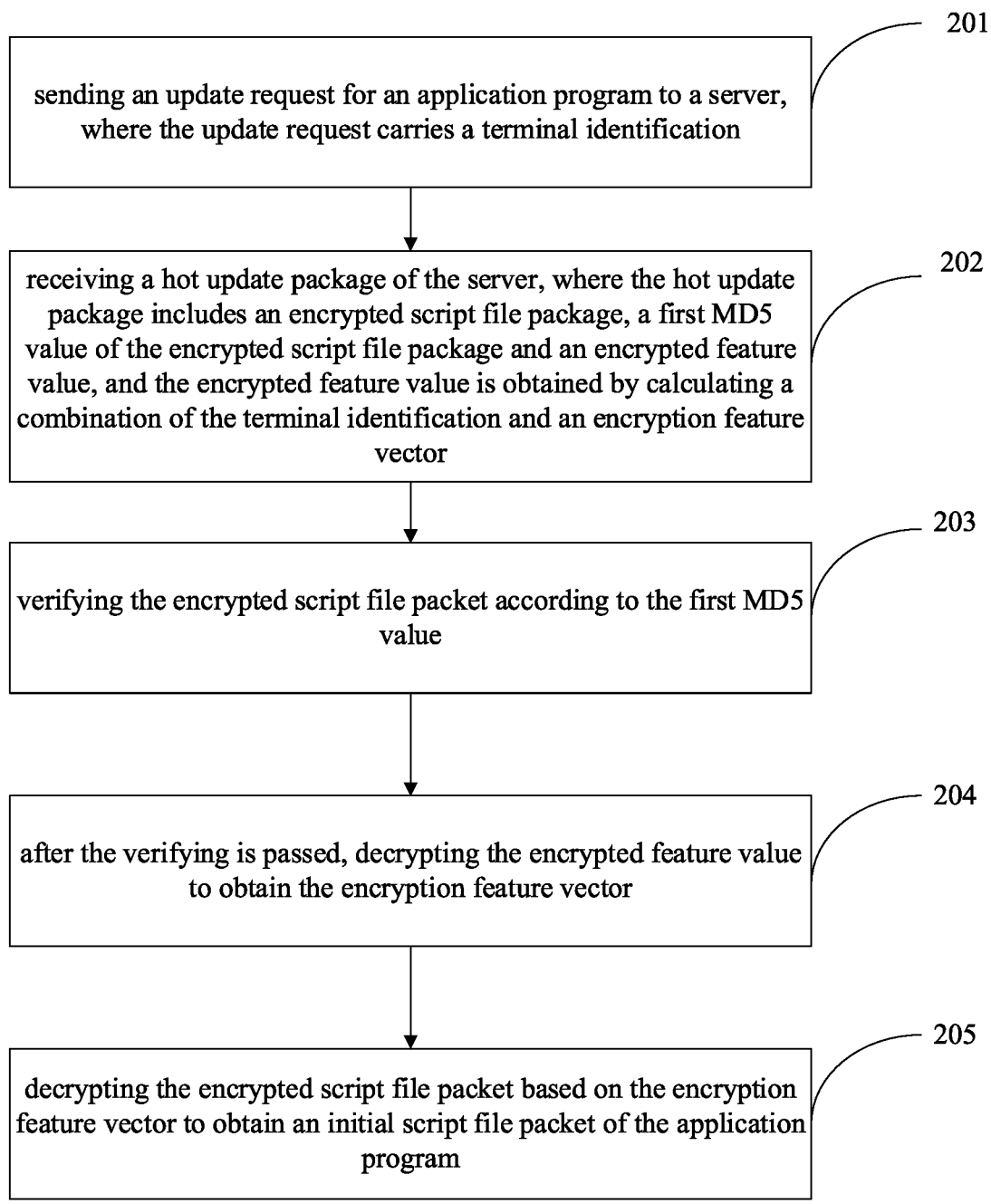
FIG. 2 is a flowchart of a hot updating method of script file package of a terminal according to an embodiment of the disclosure.

An embodiment of the present disclosure further provides a hot updating method of script file package, which is applied to a terminal, and as shown in FIG. 2, includes:

Step 201: sending an update request for an application program to a server, where the update request carries a terminal identification;
when the terminal detects that the application needs to be updated, an update request is sent to the server, where the update request carries a terminal identification, which indicates which terminal requests to be updated, and the terminal identification uniquely represents the terminal, and may specifically be a serial code of the terminal.

Step 202: receiving a hot update package of the server, where the hot update package includes an encrypted script file package, a first MD5 value of the encrypted script file package and an encrypted feature value, and the encrypted feature value is obtained by calculating a combination of the terminal identification and an encryption feature vector;

the script file package is encrypted to ensure the safety of the script file, and the first MD5 value can ensure the integrity of the script file.

Step 203: verifying the encrypted script file packet according to the first MD5 value;

the terminal can judge whether the script file is complete or not by checking the value of the first MD 5.

Step 204: after the verifying is passed, decrypting the encrypted feature value to obtain the encryption feature vector;

Step 205: decrypting the encrypted script file packet based on the encryption feature vector to obtain an initial script file packet of the application program.

In this embodiment, after the terminal sends the update request to the server, the hot update package sent to the terminal by the server includes the encrypted script file package, the first MD5 value of the encrypted script file package, and the encrypted feature value for encrypting the script file package, and by extracting the encryption feature vector from the initial script file package and encrypting the script file package, the script file package can be effectively prevented from being tampered and maliciously copied; in addition, the first MD5 value of the encrypted script file packet is sent to the terminal, so that the uniqueness and the integrity of the encrypted script file packet can be guaranteed, and the terminal can determine whether the received encrypted script file packet is complete or not by verifying the first MD5 value, so that the terminal is prevented from loading incomplete script file packets.

Specifically, the script file packet is a bundle packet.

In a specific embodiment, the hot update package further includes a second MD5 value of the identification of the application program, and after verifying the encrypted script file package based on the first MD5 value, the method further includes:

verifying the encrypted script file packet based on the second MD5 value. Therefore, the terminal can determine whether the received encrypted script file packet is directed to the application program required to be updated by the terminal by verifying the value of the second MD5, and the terminal is prevented from loading incorrect script file packets.

In a specific embodiment, the verifying the encrypted script file package based on the first MD5 value includes:

generating a third MD5 value based on the received encrypted script file packet, determining whether the third MD5 value is consistent with the first MD5 value, and passing the verifying in a case that the third MD5 value is consistent with the first MD5 value;

the verifying the encrypted script file packet based on the second MD5 value includes:

generating a fourth MD5 value based on the identification of the application program stored in the terminal, determining whether the fourth MD5 value is consistent with the second MD5 value, and passing the verifying in a case that the fourth MD5 value is consistent with the second MD5 value.

The MD5 value only represents a file, if the file is changed, the MD5 value of the file is changed inevitably, whether the file is changed or not can be judged by comparing the MD5 values, and if the third MD5 value is consistent with the first MD5 value, the encrypted script file packet is not changed in the transmission process; if the value of the fourth MD5 is consistent with the value of the second MD5, the hot update package returned by the server is indicated to the application program to be updated by the terminal.

In a specific embodiment, the decrypting the encrypted feature value to obtain the encryption feature vector includes:

decrypting the encrypted feature value through a preset key to obtain a combined value of the terminal identification and the encryption feature vector, where the preset key is agreed by a server and the terminal in advance; and capturing the encryption feature vector from the combined value based on a terminal identification stored in the terminal.

The terminal identification can only be obtained by the terminal and cannot be obtained by other terminals, the combination value is obtained by combining the terminal identification and the encryption feature vector, the encryption feature vector can be determined from the combination value only by a correct receiving terminal, and the safety of the script file can be further ensured.

In a specific embodiment, the decrypting the encrypted script file package based on the feature vector to obtain the initial script file package of the application program includes:

decomposing the feature vector into a first array and a second array, where the first array consists of an identification serial number and a corresponding line number of codes of the initial script file packet, and the second encrypted array consists of a changed identification serial number and a corresponding line number;

determining the identification serial number and the corresponding line number of the codes of the initial script file packet according to a correspondence between the first array and the second array, and restoring the encrypted script file packet into the initial script file packet based on the identification serial number and the corresponding line number.

Further, the initial script file package includes digital watermarking information, and after obtaining the initial script file package of the application program, the method further includes:

verifying, based on the digital watermarking information, whether the initial script file packet is valid; and loading the initial script file package in a case that the initial script file package is valid.

By adding the digital watermarking information to the script file package, the software copyright of the Read Native update package can be protected, the script file package is prevented from being tampered at a terminal, and even if the script file package is maliciously copied to other equipment after being decrypted, a malicious copying party can be effectively traced through the digital watermarking information.

Figure 3:
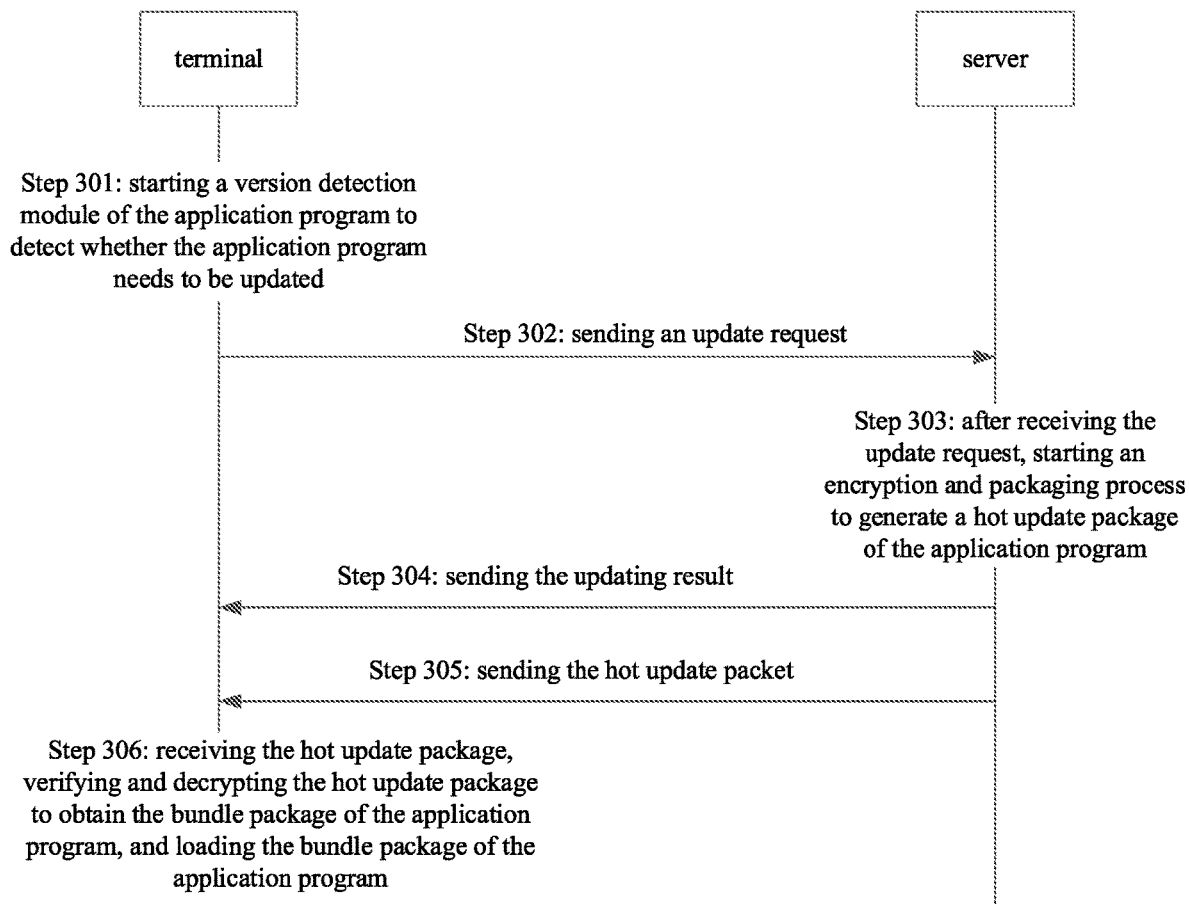
FIG. 3 is a flowchart of a hot updating method of script file package according to an embodiment of the disclosure.

The technical scheme of the present disclosure is further introduced by taking the script file packet as a bundle packet and combining the interactive flow of the terminal and the server as an example below:

as shown in FIG. 3, the hot updating method of script file package of the present embodiment includes the following steps:

Step 301: the terminal starts a version detection module of the application program to detect whether the application program needs to be updated or not;

Step 302: when the code and the resource need to be updated, the terminal sends an update request to the server;

the terminal identification and the application program identification can be carried in the update request, so that the server can know which application program of which terminal needs to be updated;

specifically, the terminal identification may be a native string code, and the terminal may obtain native string code information through a TelephonyManager class of Java, call an update package detection request network interface, and upload the native string code to the server.

Step 303: after receiving the update request, the server starts an encryption and packaging process to generate a hot update package of the application program;

the system includes an encrypting module and a packaging module, the encrypting module is started by the encryption management system, the encrypting module encrypts a bundle file of an application program, the packaging module is started, and the packaging module generates a heat updating package based on the encrypted bundle file.

Figure 4:
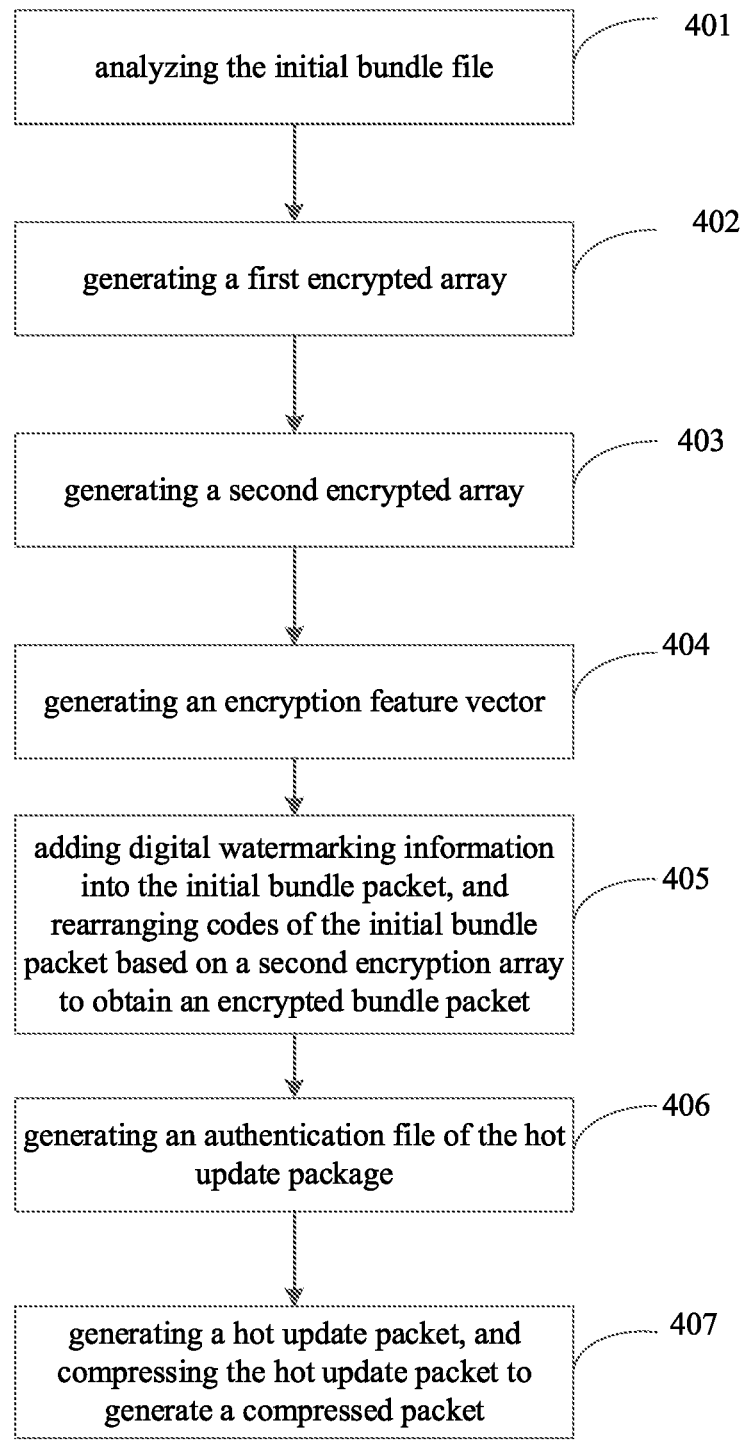
FIG. 4 is a flowchart of encryption and packaging according to an embodiment of the present disclosure.

The specific encryption and packaging flow is shown in FIG. 4, and includes the following steps:

Step 401: analyzing the initial bundle file;

specifically, an index of an initial bundle file can be opened through a text browser, and the composition structure of the initial bundle file is analyzed, wherein the initial bundle file comprises a common header part, a JS service code, a common JS method, a service entry and the like.

Step 402: generating a first encrypted array;

specifically, JS service codes, a common JS method, and id (identification) serial numbers and line numbers r of entry portions of services may be extracted to form a first encryption array $V_n$, $V_n=\{r1, r2, r3, rn, id1, id2, id3, \ldots, idn\}$, where r and id are in one-to-one correspondence, r1 is the line number of a first line code, the corresponding id serial number is id1, r2 is the line number of a second line code, the corresponding id serial numbers are id2, rn are the line number of an nth line code, and the corresponding id serial number is idn.

Step 403: generating a second encrypted array;

the id numbers and the corresponding line numbers are respectively operated by random numbers to generate changed id numbers and corresponding line numbers, and a second encryption array $H_n$ is formed by the changed id numbers and the corresponding line numbers, $H_n=\{m1, m2, m3, \ldots, mn, d1, d2, d3, \ldots dn\}$, wherein m1 is obtained by operating r1, m2 is obtained by operating r2, mn is obtained by operating rn, d1 is obtained by operating id1, d2 is obtained by operating id2, $\ldots$, and do is obtained by operating idn.

Specifically, the id number and the corresponding line number may be calculated based on a random number, for example, idi is subtracted from the random number to obtain di, ri is subtracted from the random number to obtain mi, where i is an integer greater than 0 and less than or equal to n. Wherein the random number may be generated according to an absolute time at which the server receives the update request.

Step 404: generating an encryption feature vector;

the first encryption array $V_n$ is connected with the second encryption array $H_n$ to form an encryption feature vector $W_n$.

Step 405: adding digital watermarking information into the initial bundle packet, and rearranging codes of the initial bundle packet based on a second encryption array to obtain an encrypted bundle packet;

adding specific digital watermarking information into the initial bundle packet to generate a new bundle packet. Specifically, digital watermarking information may be added according to the line number of the code, as shown in FIG. 8, for example, the value of the line number is a multiple of 2, "//2 @" is added after the corresponding code line, the line number is a multiple of 3, "//3 @" is added after the corresponding code line, the value of the line number is a multiple of 5, "//5 #" is added after the corresponding code line, the value of the line number is a multiple of 7, "//7 $" is added in the corresponding code line, and so on;

rearranging the codes of the new bundle packet based on a second encryption array, for example, if the original line number of a certain line of codes is ri, calculating the ri based on a random number to obtain a changed line number mi, adjusting the position of the line of codes according to the mi, and in the same way, rearranging the codes of the new bundle packet to obtain the encrypted bundle packet, wherein the adjusted position of the line of codes is the mi line.

Step 406: generating an authentication file of the hot update package;

the MD5 value of the encrypted bundle package is calculated to obtain a first MD5 value, specifically, a MD5 converter may be created based on MessageDigest in Java, FileInputStream and digeststream create a read and write file stream, a final MessageDigest object is obtained based on the digestdigest object, and a 32-bit MD5 value of the encrypted bundle package is obtained based on the MessageDigest. The input parameters of the MD5 converter are changed into (application program APK package name+organization ID+organization URL) to calculate a 32-bit MD5 value as a second MD5 value of the application program identification, wherein APK is Android package, namely Android installation package, and the organization can be a company or a mechanism to which the terminal belongs.

Instantiating an IvParameterSpec object, instantiating SecretKeySpec based on a specified initialization vector A, taking a second MD5 value as an incoming key, obtaining a byte array of the second MD5 value to construct the SecretKeySpec, creating a Cipher of a type of 'DES/CBC/PKCS 5 Padding' by a Cipher, initializing the Cipher object based on the key, and performing an encryption operation on (terminal identification+encryption feature vector) to obtain a DES value encrypted by Base64 as a unique encryption feature value of a hot update package.

In a specific example, when the first MD5 value is 7c01bf65f83fe918e4a7ddc40e3f2682, a is obtained as {70165839}.

Writing the first MD5 value, the second MD5 value and the encryption feature value obtained by the calculation into a file to form an authentication file.

Step 407: generating a hot update packet, and compressing the hot update packet to generate a compressed packet.

Generating a hot update package based on the authentication file authentication, the encrypted bundle package file index, the encrypted bundle package and the resource file, and compressing the hot update package to generate a compressed package.

Step 304: the server sends the updating result to the terminal;

specifically, the encryption management system may send a URL (Uniform Resource Locator) address of the hot update package to the server, and the server returns an update result to the terminal, where the update result may carry the URL address of the hot update package, so that the terminal downloads the hot update package according to the URL address of the hot update package.

Step 305: the server sends the hot update packet to the terminal;

specifically, the terminal may register an update package download package monitoring service, request the server to download the hot update package according to the URL address of the hot update package returned by the server, and the server may send the hot update package to the terminal through breakpoint retransmission.

Step 306: the terminal receives the hot update package, verifies and decrypts the hot update package to obtain the bundle package of the application program, and loads the bundle package of the application program.

In order to save transmission resources, the hot update packet sent by the server to the terminal may be a compressed packet, and the terminal needs to decompress the compressed hot update packet first after receiving the compressed hot update packet. After decompression, the terminal can obtain the encrypted bundle packet, the first MD5 value of the encrypted bundle packet and the encryption feature value.

Figure 5:
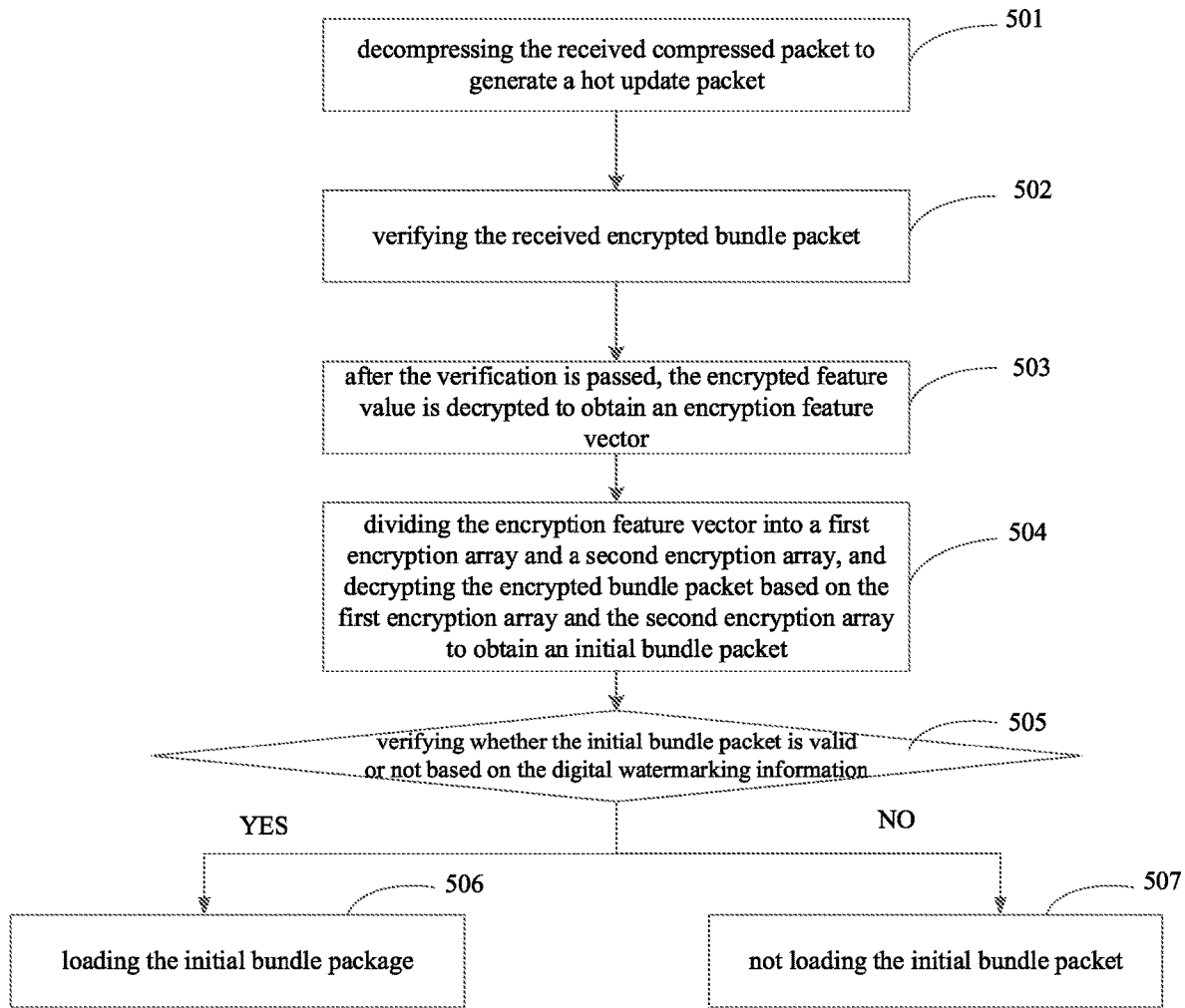
FIG. 5 is a flowchart of verification and decryption according to an embodiment of the disclosure.

The specific verification and decryption process is shown in FIG. 5, and includes the following steps:

Step 501: decompressing the received compressed packet to generate a hot update packet;

the decompressed hot update package includes an encrypted bundle package, resource files and authentication files, the authentication files comprise a first MD5 value of the encrypted bundle package, a second MD5 value of the application program identification and an encrypted feature value, and the encrypted feature value is obtained by encrypting a combination of the terminal identification and the encryption feature vector.

Step 502: verifying the received encrypted bundle packet;

the terminal may generate a third MD5 value using the received encrypted bundle packet, compare whether the third MD5 value is consistent with the first MD5 value, and when the third MD5 value is consistent with the first MD5 value, the terminal may determine that the received encrypted bundle packet is complete;

generating a fourth MD5 value based on the identification of the application program stored in the terminal, comparing whether the fourth MD5 value is consistent with the second MD5 value, and if the fourth MD5 value is consistent with the second MD5 value, passing the verification.

Step 503: after the verification is passed, the encrypted feature value is decrypted to obtain an encryption feature vector;

specifically, the DES value (i.e. encrypted feature value) of (terminal identification+encryption feature vector) in the file is extracted, first decrypted using Base64, the IvParameterSpec object is instantiated, secreterspec is instantiated using the specified initialization vector a, the second MD5 value is taken as the incoming key, the byte array thereof is obtained to construct secreterspec, a Cipher of the type "DES/CBC/PKCS5Padding" is created with cipherer, the cipherer object is initialized with the key, the decryption operation is performed on the Base64 decryption result, and the decrypted data is obtained: capturing the terminal identification in the (terminal identification+encryption feature vector) and comparing the terminal identification with the terminal identification of the local machine, and capturing the encryption feature vector Wn from the (terminal identification+encryption feature vector) after the comparison is passed; and when the comparison is failed, not loading the bundle packet.

In a specific example, when the first MD5 value is 7c01bf65f83fe918e4a7ddc40e3f2682, a is obtained as {70165839}.

Step 504: dividing the encryption feature vector into a first encryption array and a second encryption array, and decrypting the encrypted bundle packet based on the first encryption array and the second encryption array to obtain an initial bundle packet;

dividing the encryption feature vector Wn into a first encrypted array Vn and a second encrypted array Hn, determining the line number of a code in an initial bundle packet based on a correspondence of the two arrays, for example, ii in Vn corresponds to mi in Hn, idi in Vn corresponds to di in Hn, determining the line number of the code with id sequence number idi in the encrypted bundle packet as ii in the initial bundle packet based on a correspondence, and further recovering the encrypted bundle packet into a normal sequence to obtain the initial bundle packet.

Step 505: verifying whether the initial bundle packet is valid or not based on the digital watermarking information;

Step 506: loading the initial bundle package when the initial bundle package is valid;

Step 507: when the initial bundle packet is ilvalid, not loading the initial bundle packet.

In the embodiment, the whole bundle packet is encrypted and issued, the terminal decrypts and verifies the reliability of the bundle packet and then loads the bundle packet, the bundle packet added with the digital watermarking information can be directly loaded without modifying a Read Native source code, and even if the decrypted bundle packet is maliciously copied to other equipment, the bundle packet can be effectively researched through the digital watermarking; in addition, by encrypting the whole bundle packet, the integrity of the bundle packet can be effectively prevented from being tampered and ensured.

Figure 6:
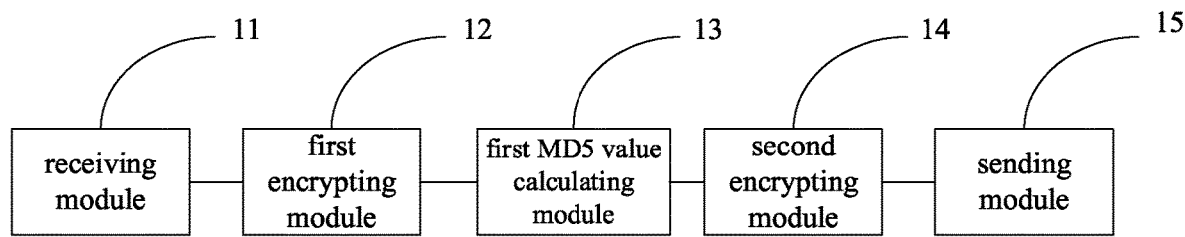
FIG. 6 is a block diagram of a hot updating device of script file package according to an embodiment of the disclosure.

An embodiment of the present disclosure further provides a hot updating device of script file package, as shown in FIG. 6, the device includes:

a receiving module 11, configured to receive an update request of a terminal for an application program, where the update request carries a terminal identification;

a first encrypting module 12, configured to acquire an initial script file packet of the application program, extract an encryption feature vector of the initial script file packet, encrypt the initial script file packet according to the encryption feature vector, and generate an encrypted script file packet;

a first MD5 value calculating module 13, configured to calculate a first MD5 value of the encrypted script file packet;

a second encrypting module 14, configured to generate a hot update package, according to the encrypted script file package, the first MD5 value and the encrypted feature value, and sending the hot update package to the terminal;

a sending module 15, configured to generate a hot update package based on the encrypted script file package, the first MD5 value, and the encrypted feature value, and send the hot update package to the terminal.

In this embodiment, the hot update package sent by the server to the terminal includes an encrypted script file package, a first MD5 value of the encrypted script file package, and an encrypted feature value for encrypting the script file package; by extracting the encryption feature vector from the initial script file packet and encrypting the script file packet, the script file packet can be effectively prevented from being tampered and maliciously copied; in addition, the first MD5 value of the encrypted script file packet is sent to the terminal, so that the uniqueness and the integrity of the encrypted script file packet can be guaranteed, and the terminal can determine whether the received encrypted script file packet is complete or not by verifying the first MD5 value, so that the terminal is prevented from loading incomplete script file packets.

Optionally, the hot updating device of script file package further includes:

a watermarking module, configured to add digital watermarking information into the initial script file packet. By adding the digital watermarking information to the script file package, the software copyright of the Read Native update package can be protected, the script file package is prevented from being tampered at a terminal, and even if the script file package is maliciously copied to other equipment after being decrypted, a malicious copying party can be effectively traced through the digital watermarking information.

Optionally, the hot updating device of script file package further includes:

a second MD5 value generation module, configured to generate a second MD5 value of an identification of the application program and add the second MD5 value into the hot update package, so that the terminal can determine whether the received encrypted script file package is specific to the application program which needs to be updated by the terminal by verifying the second MD5 value, and the terminal is prevented from loading incorrect script file packages.

Optionally, the first encrypting module includes:

an extraction unit, configured to extract an identification serial number and a corresponding line number of codes of the initial script file packet, and forming a first encryption array based on the identification serial number and the corresponding line number;

an calculating unit, configured to calculate the identification serial number and the corresponding line number respectively based on a random number, to generate a changed identification serial number and a corresponding line number, form a second encryption array based on the changed identification serial number and the corresponding line number, and form the encryption feature vector based on the first encryption array and the second encryption array; and a processing unit, configured to rearrange the codes of the initial script file packet based on the second encryption array to obtain the encrypted script file packet.

In the above embodiment, the encryption feature vector is generated based on the identification serial number of the code of the initial script file packet and the corresponding line number, but the technical solution of the present disclosure is not limited to generating the encryption feature vector based on the above method, and the encryption feature vector may also be generated based on other information of the initial script file packet.

In a specific example, the random number may be generated based on an absolute time for receiving the update request.

Optionally, the second encrypting module includes:

a combining unit, configured to combine the terminal identification and the encryption feature vector to obtain a combined value;

an encrypting unit, configured to encrypt the combined value through a preset key to obtain the encrypted feature value, where the preset key is agreed by a server and the terminal in advance.

After receiving the encrypted feature value, the terminal can decrypt the encrypted feature value based on a preset key to obtain a combined value of the terminal identification and the encryption feature vector, and then the terminal can determine the encryption feature vector from the combined value based on the terminal identification of the terminal, so that the encrypted script file packet is decrypted to obtain an initial script file packet. The terminal identification can only be obtained by the terminal and cannot be obtained by other terminals, the combination value is obtained by combining the terminal identification and the encryption feature vector, the encryption feature vector can be determined from the combination value only by a correct receiving terminal, and the safety of the script file can be further ensured. Specifically, the terminal identification may be a serial number of the terminal.

Figure 7:
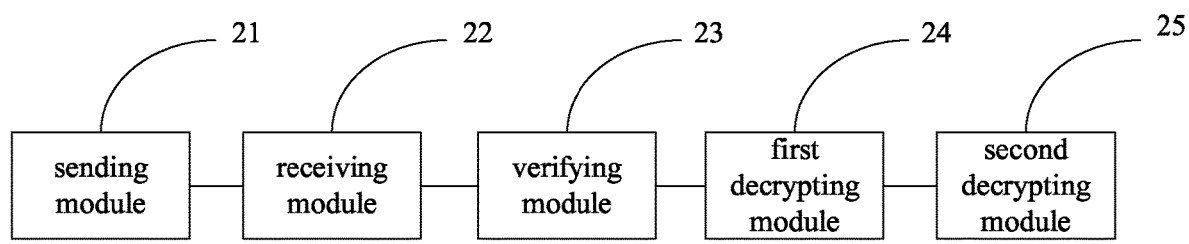
FIG. 7 is a block diagram of a hot updating device of script file package applied to a terminal according to an embodiment of the disclosure.

An embodiment of the present disclosure further provides a hot updating device of script file package, which is applied to a terminal, as shown in FIG. 7, and includes:

a sending module 21, configured to send an update request for an application program to a server, where the update request carries a terminal identification;

a receiving module 22, configured to receive a hot update package of the server, where the hot update package includes an encrypted script file package, a first MD5 value of the encrypted script file package and an encrypted feature value, and the encrypted feature value is obtained by calculating a combination of the terminal identification and an encryption feature vector;

a verifying module 23, configured to the encrypted script file packet according to the first MD5 value;

a first decrypting module 24, configured to decrypt the encrypted feature value to obtain the encryption feature vector;

a second decrypting module 25, configured to decrypt the encrypted script file packet based on the encryption feature vector to obtain an initial script file packet of the application program.

In this embodiment, after the terminal sends the update request to the server, the hot update package sent to the terminal by the server includes the encrypted script file package, the first MD5 value of the encrypted script file package, and the encrypted feature value for encrypting the script file package, and by extracting the encryption feature vector from the initial script file package and encrypting the script file package, the script file package can be effectively prevented from being tampered and maliciously copied; in addition, the first MD5 value of the encrypted script file packet is sent to the terminal, so that the uniqueness and the integrity of the encrypted script file packet can be guaranteed, and the terminal can determine whether the received encrypted script file packet is complete or not by verifying the first MD5 value, so that the terminal is prevented from loading incomplete script file packets.

Optionally, the hot update package further includes a second MD5 value of the identification of the application program, and the verifying module is further configured to verify the encrypted script file package with the second MD5 value. Therefore, the terminal can determine whether the received encrypted script file packet is directed to the application program required to be updated by the terminal by verifying the value of the second MD5, and the terminal is prevented from loading incorrect script file packets.

Optionally, the verifying module comprises:
a first verification unit, configured to generate a third MD5 value based on the received encrypted script file packet, determine whether the third MD5 value is consistent with the first MD5 value, and pass the verifying in a case that the third MD5 value is consistent with the first MD5 value;
a second verification unit, configured to generate a fourth MD5 value based on the identification of the application program stored in the terminal, determine whether the fourth MD5 value is consistent with the second MD5 value, and pass the verifying in a case that the fourth MD5 value is consistent with the second MD5 value.

Optionally, the first decrypting module includes:
a decryption unit, configured to decrypt the encrypted feature value through a preset key to obtain a combined value of the terminal identification and the encryption feature vector, where the preset key is agreed by a server and the terminal in advance;
a capturing unit, configured to capture the encryption feature vector from the combined value based on a terminal identification stored in the terminal.

The terminal identification can only be obtained by the terminal and cannot be obtained by other terminals, the combination value is obtained by combining the terminal identification and the encryption feature vector, the encryption feature vector can be determined from the combination value only by a correct receiving terminal, and the safety of the script file can be further ensured. Specifically, the terminal identification may be a serial number of the terminal.

Optionally, the second decrypting module includes:
a decomposing unit, configured to decompose the feature vector into a first array and a second array, where the first array consists of an identification serial number and a corresponding line number of codes of the initial script file packet, and the second encrypted array consists of a changed identification serial number and a corresponding line number;
a processing unit, configured to determine the identification serial number and the corresponding line number of the codes of the initial script file packet according to a correspondence between the first array and the second array, and restore the encrypted script file packet into the initial script file packet based on the identification serial number and the corresponding line number.

Optionally, the initial script file package includes digital watermarking information, the hot updating device of script file package further includes:
a watermarking verifying module, configured to verify, based on the digital watermarking information, whether the initial script file packet is valid;
a loading module, configured to load the initial script file package in a case that the initial script file package is valid.

By adding the digital watermarking information to the script file package, the software copyright of the Read Native update package can be protected, the script file package is prevented from being tampered at a terminal, and even if the script file package is maliciously copied to other equipment after being decrypted, a malicious copying party can be effectively traced through the digital watermarking information.

The embodiment of the present disclosure further provides a hot updating device of script file package, including a processor, a memory and a computer program stored in the memory and running on the processor, where the processor executes the computer program to perform the hot updating method of script file package hereinabove.

The processor may be a processor or a combination of processing elements, for example, the processor may be a CPU, an ASIC, or one or more integrated circuits configured to implement the method performed by the above hot-update device, for example: one or more microprocessors DSP, or one or more field programmable gate arrays FPGA, or the like. The storage element may be a memory or a combination of a plurality of storage elements.

The memory may be either volatile memory or nonvolatile memory, or may include both volatile and nonvolatile memory. The non-volatile memory may be a Read-only memory (ROM), a programmable Read-only memory (PROM), an erasable programmable Read-only memory (erasabprom, EPROM), an electrically erasable programmable Read-only memory (EEPROM), or a flash memory. The volatile memory may be a Random Access Memory (RAM) which serves as an external cache. By way of example, and not limitation, many forms of RAM are available, such as static random access memory (StaticRAM, SRAM), dynamic random access memory (dynamic RAM, DRAM), synchronous dynamic random access memory (Synchronous DRAM, SDRAM), double data rate synchronous dynamic random access memory (DoubleDataRateSDRAM, DDRSDRAM), enhanced synchronous dynamic random access memory (ENhancedSDRAM, ESDRAM), synchronous link dynamic random access memory (Synchlink DRAM, SLDRAM), and direct memory bus random access memory (Directrambus SRAM, DRRAM). The memory described in this disclosure is intended to comprise, without being limited to, these and any other suitable types of memory.

Embodiments of the present disclosure also provide a computer readable storage medium, on which a computer program is stored, where the computer program, when executed by a processor, implements the steps of the method for hot updating of a script file package as described above.

Those of ordinary skill in the art will appreciate that the various illustrative elements and algorithm steps described in connection with the embodiments disclosed herein may be implemented as electronic hardware, or combinations of computer software and electronic hardware. Whether such functionality is implemented as hardware or software depends upon the particular application and design constraints imposed on the technical solution. Skilled artisans may implement the described functionality in varying ways for each particular application, but such implementation decisions should not be interpreted as causing a departure from the scope of the present disclosure.

It can be clearly understood by those skilled in the art that, for convenience and simplicity of description, the specific working processes of the system, the device, and the module described above may refer to the corresponding processes in the foregoing method embodiments, and are not described herein again.

In the embodiments provided in the present disclosure, it should be understood that the disclosed device and method may be implemented in other manners. For example, the above-described device embodiments are merely illustrative, and for example, the division of the modules is only one logical functional division, and other divisions may be realized in practice, for example, a plurality of modules or components may be combined or integrated into another system, or some features may be omitted, or not executed. In addition, the shown or discussed coupling or direct coupling or communication connection between each other may be through some interfaces, indirect coupling or communication connection between devices or modules, and may be in an electrical, mechanical or other form.

In addition, functional modules in the embodiments of the present disclosure may be integrated into one processing module, or each module may exist alone physically, or two or more modules are integrated into one module.

The functions may be stored in a computer-readable storage medium if they are implemented in the form of software functional modules and sold or used as separate products. Based on such understanding, the technical solutions of the present disclosure, which are in essence or make a contribution to the related art, or portions of the technical solutions, may be embodied in the form of a software product, which is stored in a storage medium and includes several instructions for causing a computer device (which may be a personal computer, a server, or a network device, etc.) to execute all or part of the steps of the methods described in the embodiments of the present disclosure. And the aforementioned storage medium includes: a U disk, a removable hard disk, a ROM, a RAM, a magnetic disk or an optical disk, and various media capable of storing program codes.

Further, it is noted that in the device and method of the present disclosure, it is apparent that each component or each step may be decomposed and/or recombined. Such decomposition and/or recombination should be considered as equivalents of the present disclosure. Also, the steps of performing the series of processes described above may naturally be performed chronologically in the order described, but need not necessarily be performed chronologically, and some steps may be performed in parallel or independently of each other. It will be understood by those of ordinary skill in the art that all or any of the steps or elements of the methods and device of the present disclosure may be implemented in any computing device (including processors, storage media, etc.) or network of computing devices, in hardware, firmware, software, or any combination thereof, which may be implemented by those of ordinary skill in the art using their basic programming skills after reading the description of the present disclosure.

Thus, the objects of the present disclosure may also be achieved by running a program or a set of programs on any computing device. The computing device may be a well-known general purpose device. Thus, the objects of the present disclosure can also be achieved merely by providing a program product containing program code for implementing the method or device. That is, such a program product also constitutes the present disclosure, and a storage medium storing such a program product also constitutes the present disclosure. It is to be understood that such storage media can be any known storage media or any storage media developed in the future. It is also noted that in the device and methods of the present disclosure, it is apparent that the components or steps may be broken down and/or re-combined. Such decomposition and/or recombination should be considered as equivalents of the present disclosure. Also, the steps of executing the series of processes described above may naturally be executed chronologically in the order described, but need not necessarily be executed chronologically. Some steps may be performed in parallel or independently of each other.

While the foregoing is directed to alternative embodiments of the present disclosure, it will be appreciated by those skilled in the art that numerous modifications and adaptations may be made without departing from the principles set forth in the disclosure and are intended to be within the scope of the disclosure.

What is claimed is:

1. A hot updating method of script file package, comprising:
    receiving an update request of a terminal for an application program, wherein the update request carries a terminal identification;
    acquiring an initial script file packet of the application program, extracting an encryption feature vector of the initial script file packet, encrypting the initial script file packet according to the encryption feature vector, and generating an encrypted script file packet;
    calculating a first MD5 value of the encrypted script file packet;
    calculating an encrypted feature value of a combination of the terminal identification and the feature vector; and
    generating a hot update package, according to the encrypted script file package, the first MD5 value and the encrypted feature value, and sending the hot update package to the terminal.

2. The hot updating method of script file package according to claim 1, wherein prior to the encrypting the initial script file package according to the encryption feature vector, the method further comprises:
    adding digital watermarking information into the initial script file packet.

3. The hot updating method of script file package according to claim 1, further comprising:
    generating a second MD5 value of an identification of the application program, and adding the second MD5 value into the hot update package.

4. The hot updating method of script file package according to claim 1, wherein the extracting the encryption feature vector of the initial script file packet, encrypting the initial script file packet according to the encryption feature vector and generating the encrypted script file packet further comprises:
    extracting an identification serial number and a corresponding line number of codes of the initial script file packet, and forming a first encryption array based on the identification serial number and the corresponding line number;
    calculating the identification serial number and the corresponding line number respectively based on a random number, to generate a changed identification serial number and a corresponding line number, forming a second encryption array based on the changed identification serial number and the corresponding line number, and forming the encryption feature vector based on the first encryption array and the second encryption array; and rearranging the codes of the initial script file packet based on the second encryption array to obtain the encrypted script file packet.

5. The hot updating method of script file package according to claim 4, wherein the random number is generated based on an absolute time of receiving the update request.

6. The hot updating method of script file package according to claim 1, wherein the calculating the encrypted feature value of the combination of the terminal identification and the feature vector further comprises:
combining the terminal identification and the encryption feature vector to obtain a combined value; and
encrypting the combined value through a preset key to obtain the encrypted feature value, wherein the preset key is agreed by a server and the terminal in advance.

7. A hot updating method of script file package, applied to a terminal and comprising:
sending an update request for an application program to a server, wherein the update request carries a terminal identification;
receiving a hot update package of the server, wherein the hot update package comprises an encrypted script file package, a first MD5 value of the encrypted script file package and an encrypted feature value, and the encrypted feature value is obtained by calculating a combination of the terminal identification and an encryption feature vector;
verifying the encrypted script file packet according to the first MD5 value;
after the verifying is passed, decrypting the encrypted feature value to obtain the encryption feature vector; and
decrypting the encrypted script file packet based on the encryption feature vector to obtain an initial script file packet of the application program.

8. The hot updating method of script file package according to claim 7, wherein the hot update package further comprises a second MD5 value of an identification of the application program, wherein subsequent to the verifying the encrypted package of script files based on the first MD5 value, the method further comprises:
verifying the encrypted script file packet based on the second MD5 value.

9. The hot updating method of script file package according to claim 8, wherein the verifying the encrypted script file package based on the first MD5 value comprises:
generating a third MD5 value based on the received encrypted script file packet, determining whether the third MD5 value is consistent with the first MD5 value, and passing the verifying in a case that the third MD5 value is consistent with the first MD5 value;
the verifying the encrypted script file packet based on the second MD5 value comprises:
generating a fourth MD5 value based on the identification of the application program stored in the terminal, determining whether the fourth MD5 value is consistent with the second MD5 value, and passing the verifying in a case that the fourth MD5 value is consistent with the second MD5 value.

10. The hot updating method of script file package according to claim 7, wherein the decrypting the encrypted feature value to obtain the encryption feature vector comprises:
decrypting the encrypted feature value through a preset key to obtain a combined value of the terminal identification and the encryption feature vector, wherein the preset key is agreed by a server and the terminal in advance; and
capturing the encryption feature vector from the combined value based on a terminal identification stored in the terminal.

11. The hot updating method of script file package according to claim 7, wherein the decrypting the encrypted script file package based on the feature vector to obtain the initial script file package of the application program comprises:
decomposing the feature vector into a first array and a second array, wherein the first array consists of an identification serial number and a corresponding line number of codes of the initial script file packet, and the second encrypted array consists of a changed identification serial number and a corresponding line number;
determining the identification serial number and the corresponding line number of the codes of the initial script file packet according to a correspondence between the first array and the second array, and restoring the encrypted script file packet into the initial script file packet based on the identification serial number and the corresponding line number; or
the initial script file package comprises digital watermarking information, and after obtaining the initial script file package of the application program, the method further comprises:
verifying, based on the digital watermarking information, whether the initial script file packet is valid; and
loading the initial script file package in a case that the initial script file package is valid.

12. A hot updating device of script file package, comprising:
a processor, a memory and a computer program stored in the memory and running on the processor, wherein the processor executes the computer program to:
receive an update request of a terminal for an application program, wherein the update request carries a terminal identification;
acquire an initial script file packet of the application program, extract an encryption feature vector of the initial script file packet, encrypt the initial script file packet according to the encryption feature vector, and generate an encrypted script file packet;
calculate a first MD5 value of the encrypted script file packet;
calculate an encrypted feature value of a combination of the terminal identification and the feature vector; and
generate a hot update package, according to the encrypted script file package, the first MD5 value and the encrypted feature value, and sending the hot update package to the terminal.

13. The hot updating device of script file package according to claim 12, wherein the processor executes the computer program to:
add digital watermarking information into the initial script file packet.

14. The hot updating device of script file package according to claim 12, wherein the processor executes the computer program to:
generate a second MD5 value of an identification of the application program and add the second MD5 value into the hot update package.

15. The hot updating device of script file package according to claim 12, wherein the processor executes the computer program to:
extract an identification serial number and a corresponding line number of codes of the initial script file packet, and forming a first encryption array based on the identification serial number and the corresponding line number;

calculate the identification serial number and the corresponding line number respectively based on a random number, to generate a changed identification serial number and a corresponding line number, form a second encryption array based on the changed identification serial number and the corresponding line number, and form the encryption feature vector based on the first encryption array and the second encryption array; and rearrange the codes of the initial script file packet based on the second encryption array to obtain the encrypted script file packet; or the processor executes the computer program to:

combine the terminal identification and the encryption feature vector to obtain a combined value;

encrypt the combined value through a preset key to obtain the encrypted feature value, wherein the preset key is agreed by a server and the terminal in advance.

16. A hot updating device of script file package, applied to a terminal and comprising:

a processor, a memory and a computer program stored in the memory and running on the processor, wherein the processor executes the computer program to perform the hot updating method of script file package according to claim 7.

17. The hot updating device of script file package according to claim 16, wherein the hot update package further comprises: a second MD5 value of an identification of the application program, wherein the processor executes the computer program to:

verify the encrypted script file package based on the second MD5 value.

18. The hot updating device of script file package according to claim 17, wherein the processor executes the computer program to:

generate a third MD5 value based on the received encrypted script file packet, determine whether the third MD5 value is consistent with the first MD5 value, and pass the verifying in a case that the third MD5 value is consistent with the first MD5 value;

generate a fourth MD5 value based on the identification of the application program stored in the terminal, determine whether the fourth MD5 value is consistent with the second MD5 value, and pass the verifying in a case that the fourth MD5 value is consistent with the second MD5 value.

19. The hot updating device of script file package according to claim 16, wherein the processor executes the computer program to:

decrypt the encrypted feature value through a preset key to obtain a combined value of the terminal identification and the encryption feature vector, wherein the preset key is agreed by a server and the terminal in advance;

capture the encryption feature vector from the combined value based on a terminal identification stored in the terminal.

20. The hot updating device of script file package according to claim 16, wherein the processor executes the computer program to:

decompose the feature vector into a first array and a second array, wherein the first array consists of an identification serial number and a corresponding line number of codes of the initial script file packet, and the second encrypted array consists of a changed identification serial number and a corresponding line number;

determine the identification serial number and the corresponding line number of the codes of the initial script file packet according to a correspondence between the first array and the second array, and restore the encrypted script file packet into the initial script file packet based on the identification serial number and the corresponding line number; or the initial script file package comprises digital watermarking information, wherein the processor executes the computer program to:

verify, based on the digital watermarking information, whether the initial script file packet is valid;

load the initial script file package in a case that the initial script file package is valid.

* * * * *